(12) United States Patent
Yamada et al.

(10) Patent No.: US 7,729,019 B2
(45) Date of Patent: Jun. 1, 2010

(54) IMAGE READING SYSTEM AND IMAGE READING PROGRAM

(75) Inventors: Shigeki Yamada, Tokyo (JP); Takahisa Akaishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 11/870,657

(22) Filed: Oct. 11, 2007

(65) Prior Publication Data

US 2008/0030801 A1 Feb. 7, 2008

Related U.S. Application Data

(62) Division of application No. 10/408,327, filed on Apr. 7, 2003, now Pat. No. 7,327,493.

(30) Foreign Application Priority Data

Apr. 9, 2002 (JP) ............................. 2002-106497
Feb. 18, 2003 (JP) ............................. 2003-040036

(51) Int. Cl.
*H04N 1/04* (2006.01)

(52) U.S. Cl. ...................... 358/486; 358/487; 358/461; 358/506

(58) Field of Classification Search ................. 358/486, 358/487, 461, 506, 474
See application file for complete search history.

(56) References Cited

U.S. PATENT DOCUMENTS

| 6,233,059 B1 * | 5/2001 | Kodaira et al. ............... 358/1.9 |
| 6,359,706 B1 * | 3/2002 | Arita et al. .................. 358/486 |
| 7,164,511 B2 * | 1/2007 | Ford et al. ................... 358/487 |
| 2001/0055105 A1 | 12/2001 | Katakura et al. |

* cited by examiner

*Primary Examiner*—Houshang Safaipour
(74) *Attorney, Agent, or Firm*—Fitzpatrick, Cella, Harper & Scinto

(57) ABSTRACT

An object of this invention is to provide an image reading apparatus which can reselect a film type after prescanning, and after confirming the result on the monitor, perform actual scanning. To achieve this object, a film scanner selects from a color table storage a color table corresponding to the type of film, sets the color table in an image data converter, and performs prescanning. If the user reselects a film type after prescanning, the color table set before prescanning and a color table selected after prescanning are transferred to a confirmation image changing unit where the difference between the two tables is calculated. Pres-canned image data is transferred from a memory to the confirmation image changing unit, added to the difference, and returned to the memory. The color table selected after prescanning is set in the image data converter, and scanning for obtaining a high-resolution image is executed.

4 Claims, 10 Drawing Sheets

IMAGE READING SYSTEM AND IMAGE READING PROGRAM

This application is a divisional of prior application Ser. No. 10/408,327, filed Apr. 7, 2003 now U.S. Pat. No. 7,327,493, to which priority under 35 U.S.C. §120 is claimed.

FIELD OF THE INVENTION

The present invention relates to a technique of reading an image on a film and, more particularly, to a technique of effectively reading an image printed on a photographic film or the like and reproducing a high-quality image.

BACKGROUND OF THE INVENTION

A film scanner is an apparatus for obtaining an image printed on a film as digital data.

The arrangement of the film scanner will be explained with reference to FIG. 9.

FIG. 9 is a block diagram showing a scanner. Reference numeral 101 denotes a light source which irradiates a film 102. The film 102 is a positive color film or negative color film. Reference numeral 103 denotes an imaging lens; and 104, a CCD on which an image on the film 102 is formed via the lens 103. The CCD includes line sensor CDs for three colors, to which R, G, and B color separation filters are respectively adhered. An image on a film is color separated and output as analog signals. Reference numeral 105 denotes an A/D converter which converts an analog signal into a digital signal. The digital signal is output as 10-bit data for each of R, G, and B. Reference numeral 106 denotes a color table storage which stores color conversion tables for respective negative film types. The color conversion table is a one-dimensional LUT (Look-Up Table) for each of R, G, and B. That is, three LUTs are prepared for each film. FIG. 10 shows an example of the LUT. With this conversion table, 10-bit negative data is converted into 8-bit positive data. For example, as for color negative films, the color balance and tone characteristic change between films of respective types. Thus, an LUT must be prepared for each film. Reference numeral 107 denotes an image data converter which converts image data by using a one-dimensional LUT stored in the color table storage 106. A negative image is converted into a positive image with an adjusted color balance, resulting in 8-bit data for each of R, G, and B. Reference numeral 108 denotes a memory in which image data processed by the image data converter 107 is written. After an image of one frame is written, the image is transferred to a host PC (not shown).

A conventional scanning sequence executed under the control of the host PC will be explained.

<Step S1>

The user loads a film into a scanner.

<Step S2>

The scanner automatically determines a film type from a bar code printed on the film.

<Step S3>

A color table (LUT: Look-Up Table) corresponding to the film type is automatically set in the scanner. Alternatively, the user sets an LUT by designating an arbitrary film type.

<Step S4>

Prescanning for obtaining a low-resolution confirmation image is performed.

<Step S5>

The user selects an image to be actually used from prescanned images, and executes scanning for obtaining a high-resolution image.

In scanning a transparent original such as a photographic film, the original is irradiated by the light source. Transmitted light is converted into an electrical signal by the photoelectric converter, and the electrical signal is A/D-converted, obtaining desired digital data. The obtained digital signal is converted into a digital signal as a scanner output signal via a digital signal conversion table (look-up table).

In general, image scanning of this type is performed in two, prescanning and actual scanning.

Prescanning is first done at a low resolution. Prescanning conditions are unique settings determined depending on the film type such as a negative or positive film. A prescanned image is displayed as a preview image on the monitor. The user observes this preview image, manually sets the brightness, color balance, and the like for actual scanning, and then performs actual scanning.

According to this method, however, the user must determine actual scanning settings for each original, a long time is taken for processing many images, and a heavy burden is put on the user. To solve this problem, there is considered a method of analyzing a prescanned image by a computer, automatically setting scanning conditions for actual scanning on the basis of the analysis result, and performing actual scanning.

For example, the average brightness of an original is calculated from a prescanned image, the light quantity of the light source is changed in accordance with the brightness, and the CCD arrival light quantity is adjusted. Alternatively, the scanning speed (feed speed) is adjusted, and scanning suitable for each original is performed, effectively acquiring information printed on the original. In addition to this method, there is proposed another scanning method of executing pre-prescanning before prescanning.

That is, the prescanning precision is further increased in advance by adding one scanning step before prescanning so as to execute prescanning and actual scanning under conditions optimal for each film type with respect to various negative-base color film densities. As a result, the precision of subsequent actual scanning is increased. In this case, pre-prescanning is performed at unique settings determined in advance, acquiring a negative-base digital count in the negative-base region. Prescanning is executed at analog settings which change the negative-base digital count to a predetermined value. This increases the prescanning and actual scanning precisions.

An original is irradiated by the light source, transmitted light is converted into a linear electrical signal by the photoelectric converter at the original transmission ratio, and the electrical signal is A/D-converted into a digital signal. The obtained digital signal is further converted into a digital signal as a scanner output via a look-up table. By changing the look-up table, the scanner can cope with the film type such as a negative or positive film. For example, actually available scanners adopt a method of manually or automatically selecting a plurality of look-up tables for respective films that are accumulated in a host computer, and removing the color balance characteristic which changes between films of respective types.

In the above-described prior art, the film type is decided in film loading. In other words, an LUT for use is decided in film loading. The film type automatically selected in film loading or the film type arbitrarily selected by the user cannot be changed after prescanning, which poses a problem. The scanner may mistake automatic determination of the film type and misidentify the film type. In this case, if the user is not aware of the misidentification and performs prescanning, an LUT not suitable for the film is used, and a prescanned image is poor in color balance. At this time, the user becomes aware of misidentification of the film type, but cannot change the film type (LUT) and continue work because the film type and a corresponding LUT have already been decided. The user must interrupt work and restart it from film loading.

In the method of calculating the average brightness of an original from a prescanned image and deciding analog settings (light quantity, scanning speed, electrical gain, offset, and the like) for actual scanning, if prescanning is done using a look-up table which changes depending on the film type, the average brightness range changes for each exposure condition (underexposure, correct exposure, or overexposure) because the shapes of respective look-up tables are different. The exposure condition of the negative film of an original cannot be accurately grasped, and actual scanning cannot be performed at optimal analog settings.

In the method of determining an exposure condition from the average brightness of a prescanned image, if acquisition of the digital count of the negative-base region in pre-prescanning fails due to any reason, analog settings which set the negative-base digital count to a predetermined value cannot be obtained. The exposure condition cannot be determined from the average brightness calculated from the prescanned image.

A prescanned image is displayed as a preview image on the monitor. The preview image must be an image which simulates an image in actual scanning. When analog settings are the same between prescanning and actual scanning, the same A/D-converted digital data are input to the look-up table. A look-up table for a prescanned image is so changed as to obtain the optimal brightness and color balance, the prescanned image is corrected, and an actual scanning look-up table corresponding to the corrected prescanned image is set.

However, when analog settings are different between prescanning and actual scanning, different A/D-converted digital data are input to the look-up table. The colors of a preview image and actually scanned image cannot coincide with each other unless A/D-converted digital data in actual scanning is predicted from a prescanned image.

If a prescanned image is scanned using a look-up table for each film type in predicting A/D-converted digital data in actual scanning from a prescanned image, A/D-converted digital data in actual scanning cannot be predicted directly from the prescanned image because the look-up table for each film type is a conversion table which has a nonlinear relationship with A/D-converted digital data. In this case, the look-up table used in prescanning must be searched for on the basis of the digital count of the prescanned image, and A/D-converted digital data in prescanning must be calculated to predict digital data in actual scanning. This greatly complicates processing of making the colors of a preview image and actually scanned image coincide with each other.

SUMMARY OF THE INVENTION

It is an object of the present invention to allow reselecting the film type (LUT) again even after prescanning.

It is another object of the present invention to allow to reproduce a high-quality image by accurately determining the exposure condition of the negative film of an original and performing optimal analog settings, to eliminate the color balance characteristic which changes depending on the film type, and to easily simulate an actual scanning image by a preview image at a high precision.

To solve the above-described problems and achieve the above objects, according to the first aspect of the present invention, an image reading system which can read a film original and performs at least two scanning operations including prescanning and actual scanning is characterized by comprising a film type selecting unit, wherein a film type can be selected by the film type selecting unit after obtaining at least prescanned image data.

The image reading system according to the present invention is also characterized in that the system further comprises an image changing unit adapted to change prescanned image data, and when the film type is changed by the film type selecting unit after obtaining prescanned image data, the prescanned image data is changed by the image changing means in accordance with the changed film type.

According to the second aspect of the present invention, an image reading program in an image reading system which can read a film original and performs at least two scanning operations including prescanning and actual scanning is characterized by comprising a prescanning module for obtaining prescanned image data, an actual scanning module for obtaining actually scanned image data, and a film type selecting module, wherein a film type can be selected in the film type selecting module after obtaining at least the prescanned image data.

According to the third aspect of the present invention, an image reading system which can read a film original and performs at least two scanning operations including prescanning and actual scanning is characterized by comprising a photoelectric conversion unit adapted to read light having transmitted through the film original and converting the transmitted light into an electrical signal, an adjustment unit adapted to adjust level of the electrical signal output from the photoelectric conversion means, an A/D conversion unit adapted to convert the electrical signal whose level is adjusted by the adjustment unit into digital data, a table conversion processing unit adapted to perform table conversion processing for the digital data by using a look-up table, and a control unit to determine an exposure state of the film original from prescanned image data which has undergone table conversion processing by the table conversion processing unit and is linear with respect to an output from the A/D conversion unit, setting an adjustment state of the adjustment unit in actual scanning in accordance with the exposure state, performing digital calculation for the prescanned image data, and generating display image data which reflects a setting of the adjustment state.

According to the fourth aspect of the present invention, an image reading program in an image reading system which can read a film original, comprises photoelectric conversion unit adapted to read light having transmitted through the film original and converting the transmitted light into an electrical signal, an adjustment unit adapted to adjust level of the electrical signal output from the photoelectric conversion unit, and an A/D conversion unit adapted to convert the electrical signal whose level is adjusted by the adjustment unit into digital data, and performs at least two scanning operations including prescanning and actual scanning is characterized by comprising a table conversion processing module for performing table conversion processing for the digital data by using a look-up table, a determining module for determining an exposure state of the film original from prescanned image data which has undergone table conversion processing by the table conversion processing module and is linear with respect to an output from the A/D conversion unit, and setting an adjustment state of the adjustment unit in actual scanning in accordance with the exposure state, and an image data generating module for performing digital calculation for the prescanned image data, and generating display image data which reflects a setting of the adjustment state.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described below with reference to the accompanying drawings.

First Embodiment

Figure 1:
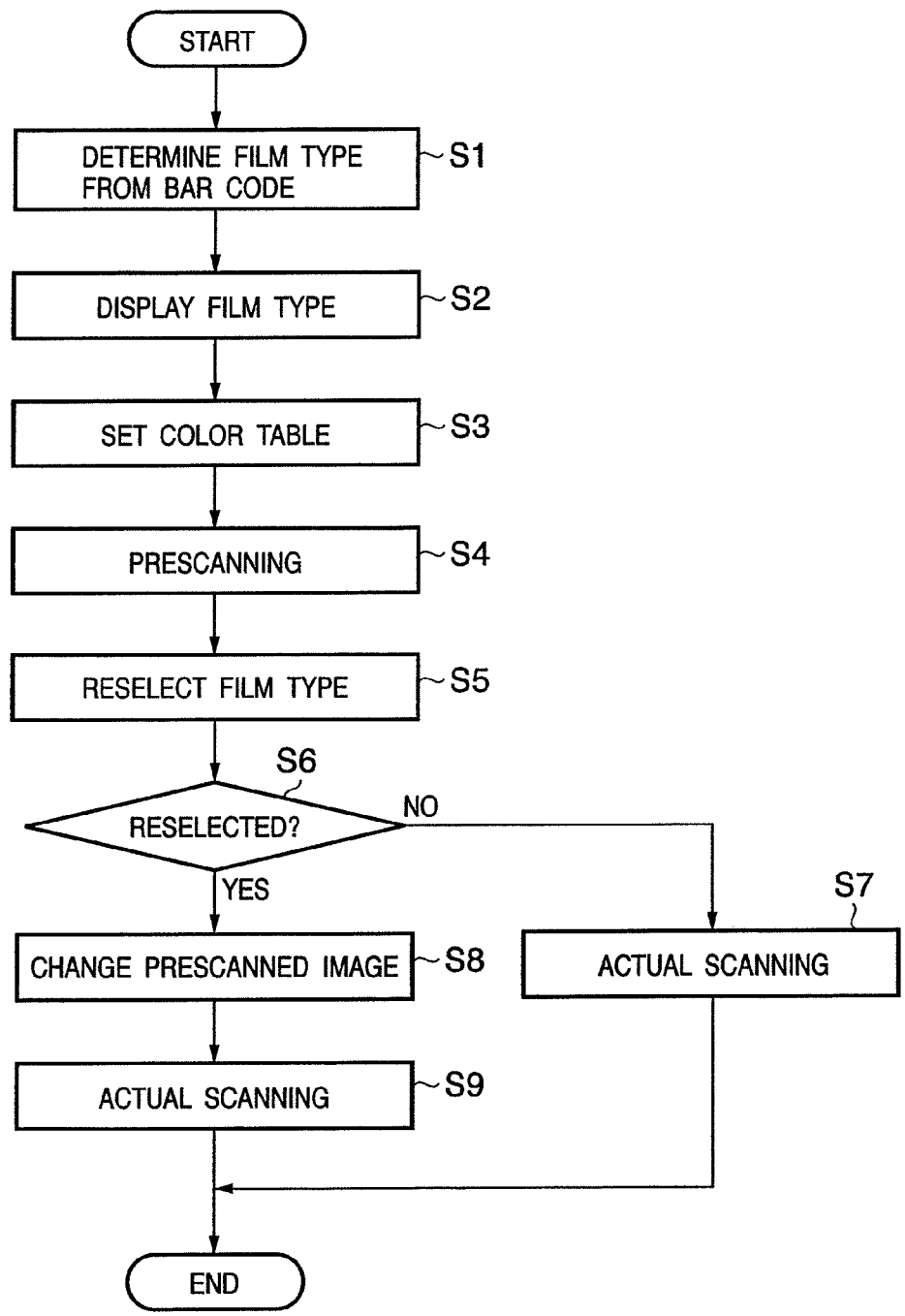
FIG. 1 is a flow chart showing scanning by a film scanner serving as an image reading apparatus according to the first embodiment of the present invention.

FIG. 1 is a flow chart for explaining a processing flow in a film scanner serving as an image reading apparatus according to the first embodiment of the present invention. The film scanner will be described in accordance with the processing flow. The first embodiment will exemplify a negative film, and a series of reading processes are executed under the control of a host PC (not shown) connected to the film scanner.

<Step S1>

The user loads a negative film into the scanner. Bar codes are printed on the upper and lower surfaces of a negative film in advance in order to specify a film type. The scanner has a sensor for reading a bar code, in addition to an image reading sensor, and can obtain a bar code. The scanner stores in advance a correspondence table for bar codes and film types, and can specify a film type from a bar code.

<Step S2>

Figure 2:
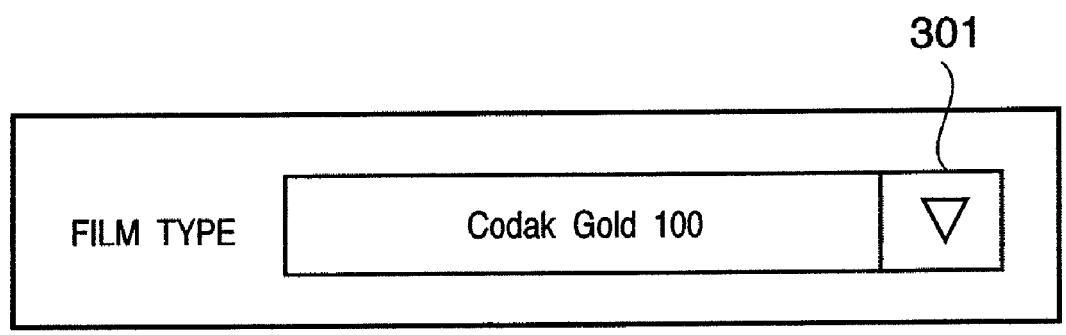
FIG. 2 is a view showing the GUI of a film type display/selecting unit in the film scanner serving as the image reading apparatus according to the first embodiment of the present invention.

The determined film type is so displayed as to allow the user to recognize it. FIG. 2 shows a display example on a GUI (Graphical User Interface) according to the first embodiment. If a detected bar code is found in the correspondence table, a corresponding film type name is displayed. If the bar code is not found in the correspondence table, "standard" is displayed. In this case, a standard table is set later, and prescanning and scanning are executed. Note that the GUI also serves as a film type selecting function. If the user clicks an inverted triangle 301, the list box is opened down to display all registered film types. The user can select an arbitrary film type from the displayed film types.

<Step S3>

Figure 3:
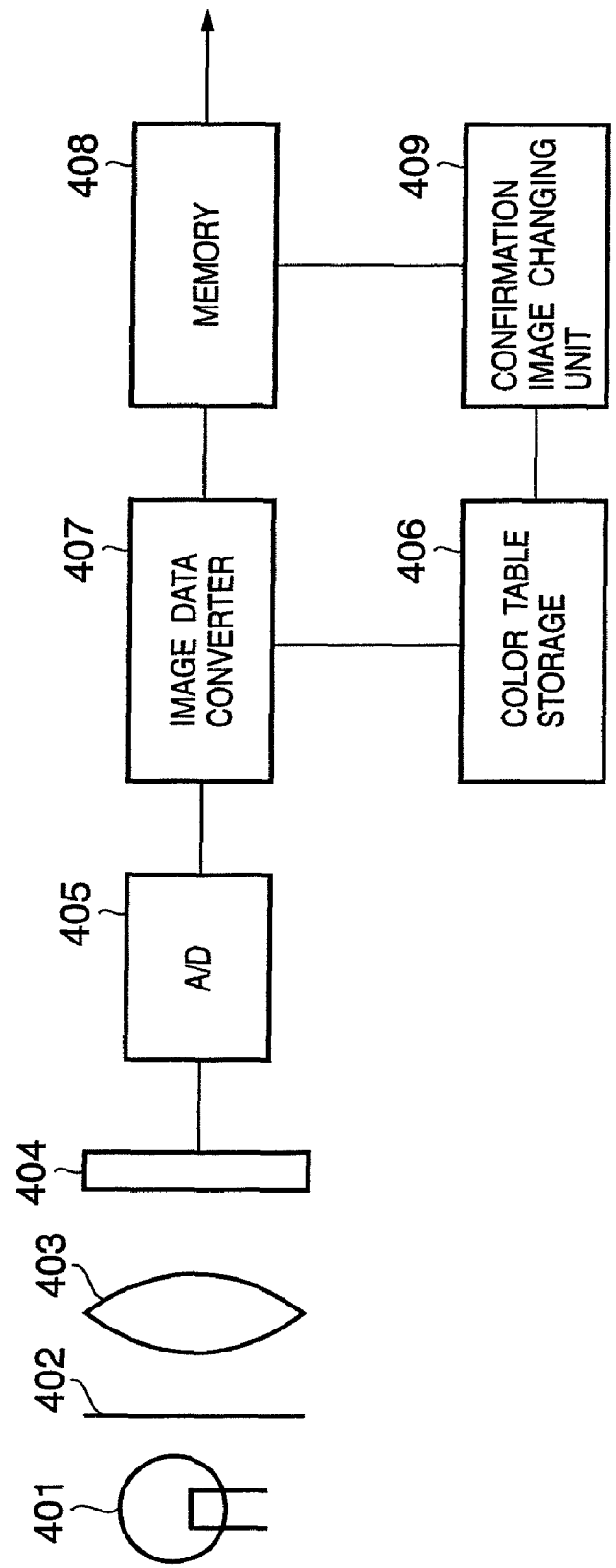
FIG. 3 is a block diagram showing the arrangement of the film scanner serving as the image reading apparatus according to the first embodiment of the present invention.
Figure 9:
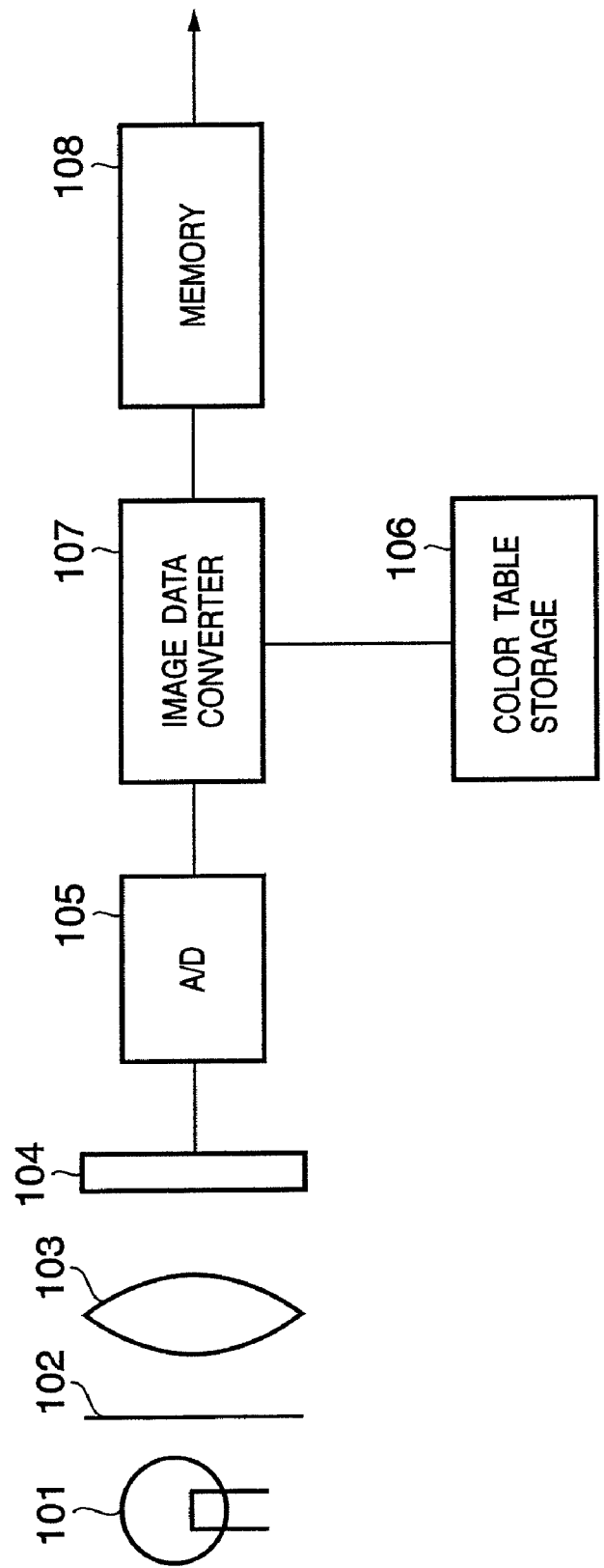
FIG. 9 is a block diagram showing the arrangement of a conventional film scanner.
Figure 10:
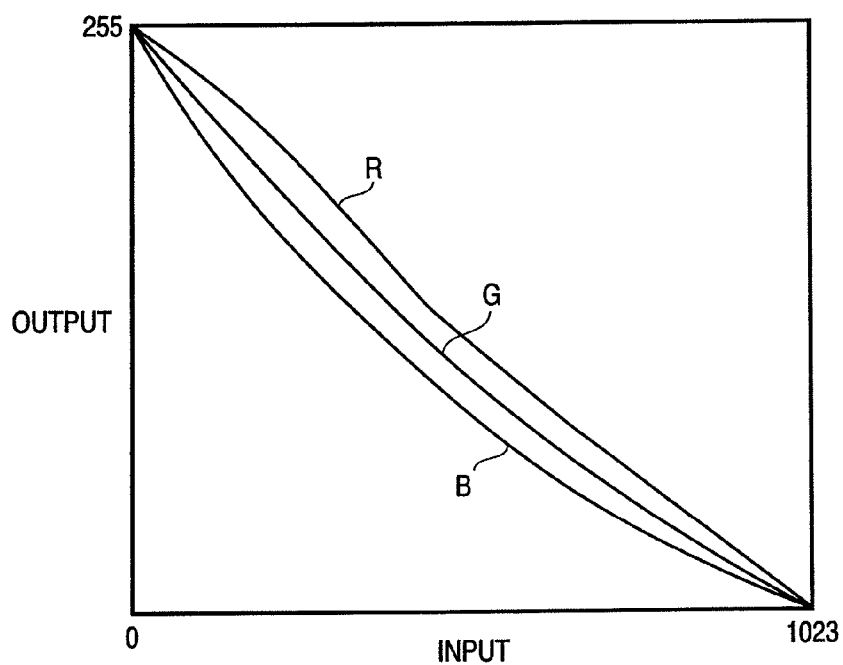
FIG. 10 is a table showing a color table corresponding to the film type.

FIG. 3 is a block diagram showing the scanner according to the first embodiment. The scanner has almost the same arrangement as that in FIG. 9, and a description of the same functions will be omitted. A color conversion table corresponding to the film type selected in step S2 is set in the scanner. More specifically, a color table storage 406 stores color conversion tables for respective film types. The color conversion table is a one-dimensional LUT for each of R, G, and B, and is identical to that shown in FIG. 10. That is, three LUTs are prepared for each film. In step S3, a color conversion table corresponding to the film type selected in step S2 is set in an image data converter 407. FIG. 10 shows a table for a 10-bit input and 8-bit output, but the first embodiment adopts a 14-bit input and 16-bit output.

<Step S4>

Prescanning for acquiring a confirmation image is performed. The image data converter 407 converts 14-bit negative data into 16-bit positive data by using the color conversion table set in step S3. This will be further explained with reference to FIG. 3. The color conversion table has already been set in the image data converter 407. Image data is converted from negative data to positive data by using the color conversion table, and the positive data is stored in a memory 408.

<Step S5>

If the scanner fails to determine the film type or the user reselects an arbitrary film type, the user reselects a film type by using the GUI in FIG. 2. In FIG. 3, a table selected from color conversion tables stored in the color table storage 406 is set in the image data converter 407.

<Step S6>

Whether the user has reselected a film type is determined.

<Step S7>

If the user does not reselect any film type, actual scanning for obtaining a high-resolution image to be actually used is performed using the color conversion table which has already been set, thus obtaining an image. The same scanning as prescanning is done except the difference in resolution.

<Step S8>

If the user reselects a film type, color conversion corresponding to the reselected film type is performed for all prescanned images. More specifically, letting r1, g1, and b1 be values obtained from the color conversion table which has already been set, and r2, g2, and b2 be values which should be obtained from the newly selected color conversion table, differences Δ are $\Delta r = r2 - r1$ $\Delta g = g2 - g1$ $\Delta b = b2 - b1$ Hence, a corrected image is obtained by calculating the differences Δ from the two tables and adding the differences Δ to a confirmation image. The result of color conversion is immediately displayed on the monitor (not shown), and the user can confirm the differences between the tables as an image in real time. This will be further explained with reference to the block diagram of FIG. 3. The color conversion table used in prescanning and the color conversion table newly reselected by the user are transferred from the color conversion table storage 406 to a confirmation image changing unit 409. The confirmation image changing unit 409 calculates the differences between the two tables. A prescanned image stored in the memory 408 is transferred to the confirmation image changing unit 409, and the calculated differences are added. The processing result is transferred to the memory 408, and displayed on the monitor.

<Step S9>

The color conversion table reselected by the user is set in the image data converter 407. Scanning for obtaining a high-resolution image to be actually used is performed to acquire an image. The same scanning as prescanning is done except the differences in resolution and color conversion table.

The present invention may be applied to a system including a plurality of devices (e.g., a computer, interface device, and scanner) or a single apparatus having these functions.

The present invention is also achieved when a storage medium (or recording medium) which stores software program codes for realizing the functions of the first embodiment described above and the second and third embodiments to be described later is supplied to a system or apparatus, and the computer (or the CPU or MPU) of the system or apparatus reads out and executes the program codes stored in the storage medium. In this case, the program codes read out from the storage medium realize the functions of the embodiments, and the storage medium which stores the program codes constitutes the present invention. The functions of the embodiments are realized when the computer executes the readout program codes. Also, the functions of the embodiments are realized when an OS (Operating System) running on the computer performs part or all of actual processing on the basis of the instructions of the program codes.

The functions of the embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

As described above, according to the first embodiment, the user can select a film type even after prescanning when the scanner fails to determine the bar code of a film but the user is not aware of it and performs prescanning, or when determination of a bar code is successful, prescanning is performed using a color conversion table corresponding to the film, but a proper color balance cannot be obtained. In the prior art, the user must interrupt scanning and restart it from film loading. According to the first embodiment, the user can continue work, increasing the working efficiency. If a desired color balance cannot be attained after prescanning, the user can successively reselect various color conversion tables many times and adjust the color balance while observing the monitor. As a result, an image can be easily obtained with a good color balance.

Second Embodiment

Figure 4:
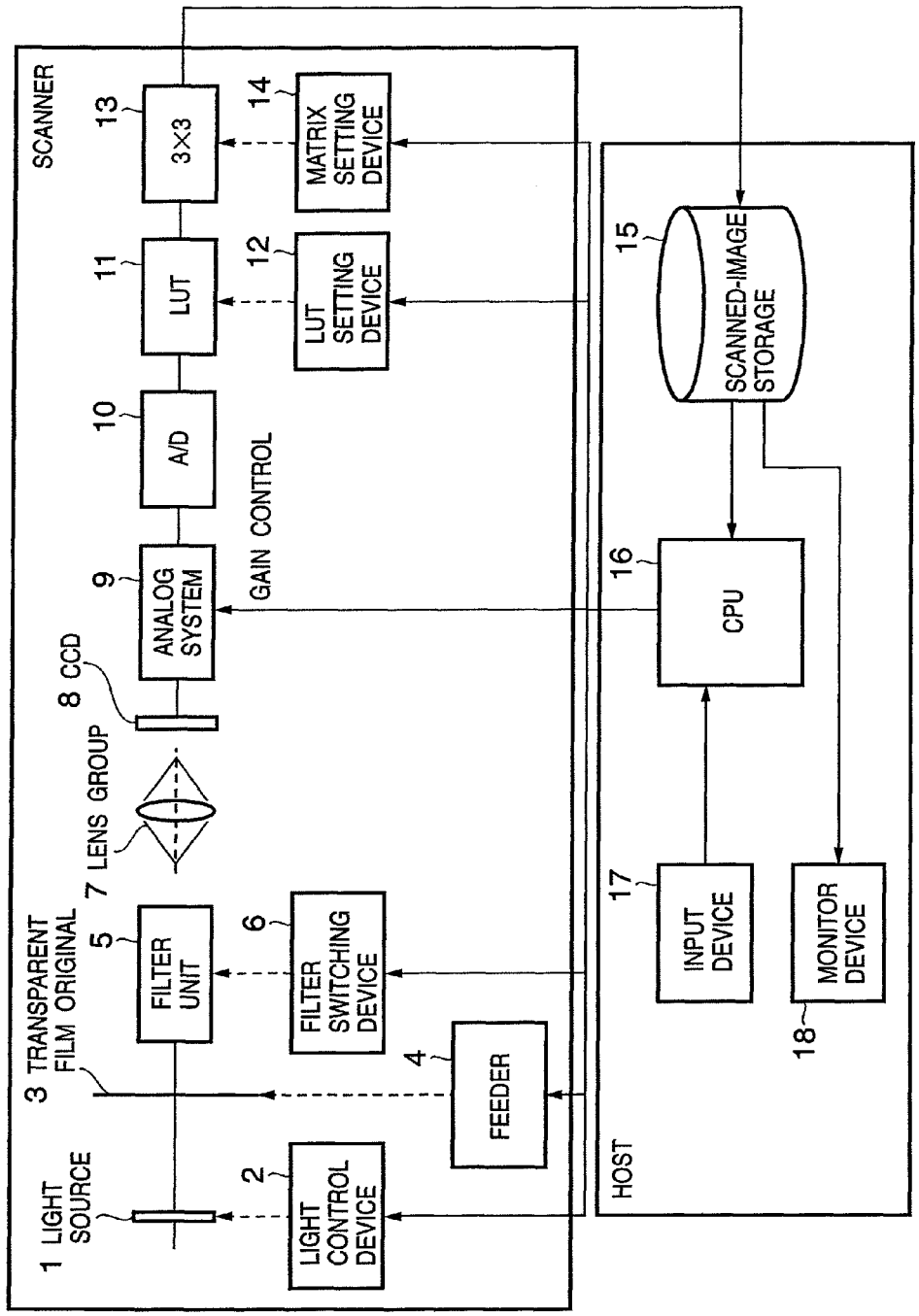
FIG. 4 is a block diagram showing the arrangement of the second embodiment of the present invention.

FIG. 4 is a block diagram showing the arrangement of an "image input (image reading) system" according to the second embodiment. In FIG. 4, reference numeral 1 denotes a light source whose light quantity (light intensity) can be changed by a light control device 2; 3, a transparent film original whose feed speed can be changed by a feeder 4; 5, a filter unit which incorporates an ND filter for adjusting the CCD arrival light quantity and a negative-base removal filter inserted in scanning a negative film; 6, a filter switching device; 7, a lens group which condenses light having transmitted through the original 3; 8, a CCD for separation into three, R, G, and B colors that converts light having transmitted through the lens group 7 into an electrical signal; 9, an analog system which applies an electrical offset or gain to an electrical signal obtained by the CCD 8; 10, an A/D converter; and 11, a digital image converter which converts a digital signal (negative data or positive data) into another digital signal (positive data). An LUT (Look-Up Table) setting device 12 sets a color conversion table (LUT: Look-Up Table) in the digital image converter 11. The number of output bits of the color conversion table set in the digital image converter 11 is equal to or higher than the number of input bits (e.g., 14-bit input and 16-bit output). Reference numeral 13 denotes a color conversion matrix converter; 14, a matrix setting device which sets a matrix coefficient in the matrix converter 13; 15, a storage for accumulating a scanned image; 16, a CPU which controls the respective units; 17, an input device such as a keyboard; and 18, a monitor device.

Figure 5:
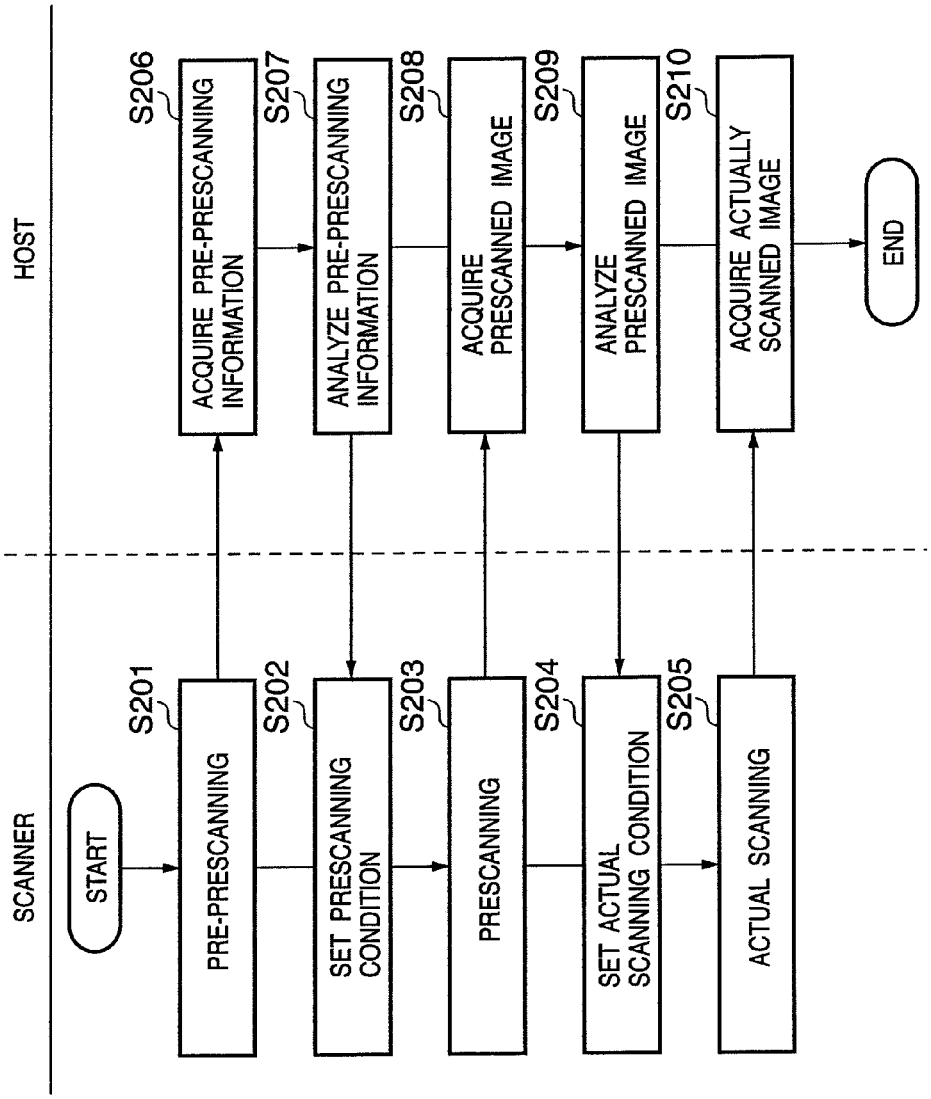
FIG. 5 is a flow chart showing the relationship between instructions and processes in a host computer and scanner.

A processing flow in the respective units will be explained with reference to FIGS. 4 and 5.

Scanning starts when the user sets an original on the scanner. In S201 of FIG. 5, if an original is set on the scanner, pre-prescanning is automatically performed at a lower resolution than that in actual scanning. The setting values of pre-prescanning are fixed regardless of the film type. Setting values are not controlled by a host computer, but are held in the scanner main body and automatically set. At this time, information on the set original is transferred from the scanner to the host computer. When a negative film is set as the original, an image in the negative-base region and bar code information are transferred (S206).

The host computer receives and analyzes the pre-prescanning information (S207). When the set original is a negative film, the host computer calculates the average count value of the negative-base from the image in the negative-base region, and decides an analog gain condition which changes the average count value into a predetermined value. The host computer analyzes the bar code information and determines the type of set negative film. Alternatively, the user can select a film type on the GUI of the scanner driver. The host computer instructs the scanner to set prescanning conditions in accordance with the film type analyzed by pre-prescanning or the film type set by the user. The scanner sets the conditions (S202). The conditions are unique to the film type, and the light control device 2, feeder 4, filter switching device 6, LUT setting device 12, and matrix setting device 14 in FIG. 4 are set. At this time, a look-up table (color conversion table) which changes depending on the film type is not set in the LUT setting device 12, but the same look-up table which provides a linear output with respect to A/D-converted digital data (output from the A/D converter 10) is set regardless of the film type.

Prescanning is executed at a lower resolution than that in actual scanning (S203). An analog signal obtained from the original under the set conditions is converted into a digital signal by the A/D converter 10. Negative data is converted into positive data by the digital image converter 11 (for a negative film; for a positive film, this conversion processing is omitted). The prescanned image is accumulated in the scanned-image storage 15 of the host computer (S208). The CPU 16 creates a histogram from the prescanned image, and calculates a feature such as the average count value or data distribution of the image (S209). An image which simulates an actual scanning image is created from the prescanned image on the basis of the analysis result, and displayed as a preview image on the monitor device 18. In addition, the light quantity of the light source, filter, feed speed, gain, offset, actual scanning LUT, and matrix setting value are decided for optimal actual scanning conditions on the basis of the analysis result. To set these values, the adjustment states of adjustment means such as the light control device 2, feeder 4, filter switching device 6, LUT setting device 12, and matrix setting device 14 are controlled (set) (S204).

Actual scanning is performed under actual scanning conditions set in the above manner (S205). Light having passed through the filter unit 5 is converted into an electrical signal by the CCD 8. The electrical signal is converted into a digital signal by the A/D converter 10. The digital signal is further converted from a negative signal into a positive signal by the digital image converter 11. The positive signal is accumulated in the scanned-image storage 15 of the host computer via the color correction matrix converter 13.

Figure 6:
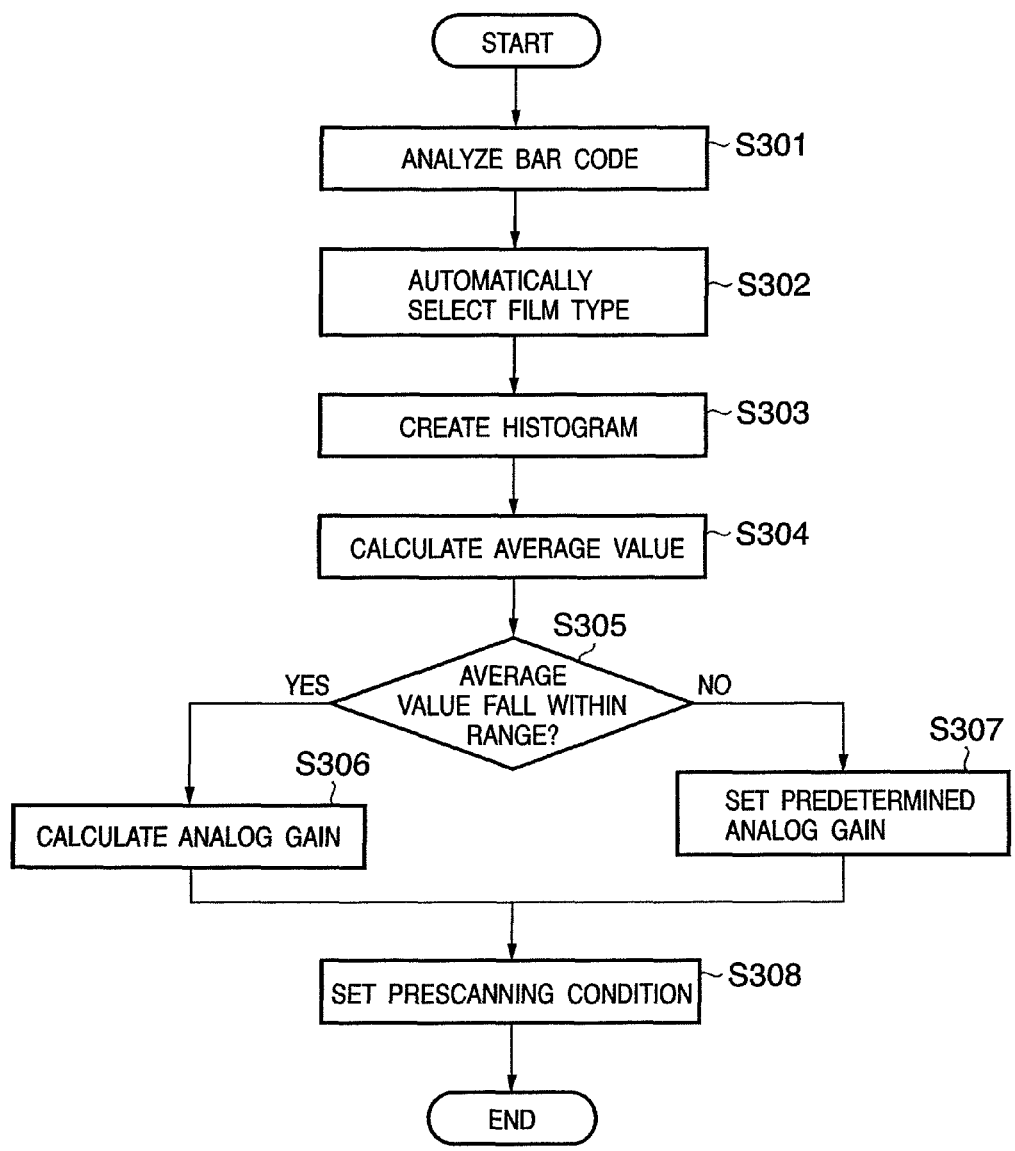
FIG. 6 is a flow chart showing a pre-prescanning information analysis processing flow.

Processing in pre-prescanning information analysis S207 of FIG. 5 will be explained in detail. In this case, an original to be processed in the first embodiment is a negative film. FIG. 6 is a flow chart showing processing in pre-prescanning information analysis (S207).

In step S301, bar code information of a negative film is analyzed. By analyzing bar code information of the negative film, the type of negative film of a set original is determined.

In step S302, a film type is selected. In the first embodiment, scanning condition settings are determined in advance for each film type, and the scanning conditions are registered, in order to absorb the negative-base density and color balance characteristic which change depending on the film type. The scanning conditions are saved as a setting value file for each film type. In general, a film type determined from the bar code analyzed in step S301 is automatically selected. Note that the user can also select a film type on the GUI of the scanner driver. When the user selects a film type, priority is given not to the automatically selected film type but the user-selected film type.

In step S303, the histogram of the negative-base image is created. Histograms for R, G, and B channels are created.

In step S304, the average value of the negative-base image is calculated. The average count values of the R, G, and B channels are calculated from the histograms created in S303.

In step S305, whether the average value of the negative-base image calculated in S304 falls within a predetermined range is determined. If NO in S305, scanning of the negative-base region in pre-prescanning is determined to fail due to some reason. If YES in S305, the processing shifts to S306; if NO, to S307.

In step S306, the analog gain of prescanning is decided. The analog gain which attains a predetermined value in scanning under scanning conditions for the film type to which the average value of the negative-base image calculated in S304 is selected is calculated.

In step S307, an analog gain when pre-prescanning fails and the negative-base average value cannot be acquired is set. In this case, analog gain data is read out from a setting value file for the selected film type, and the data is set. Even for the same negative film type, the negative-base color slightly changes owing to variations in phenomenon or the like. The analog gain value in the setting value file is an analog gain calculated on the basis of the average negative-base value of the film type. Since the negative-base count value is set to a predetermined value in prescanning, the analog gain set in step S307 is lower in precision than the analog gain calculated in S306.

In step S308, prescanning conditions are set. Scanning condition setting values other than the analog gain which has already been decided are read out from the setting value file for the selected film type. In prescanning, the same color conversion table (look-up table) which provides a linear output with respect to A/D-converted digital data is set in the digital image converter 11 regardless of the film type.

Figure 7:
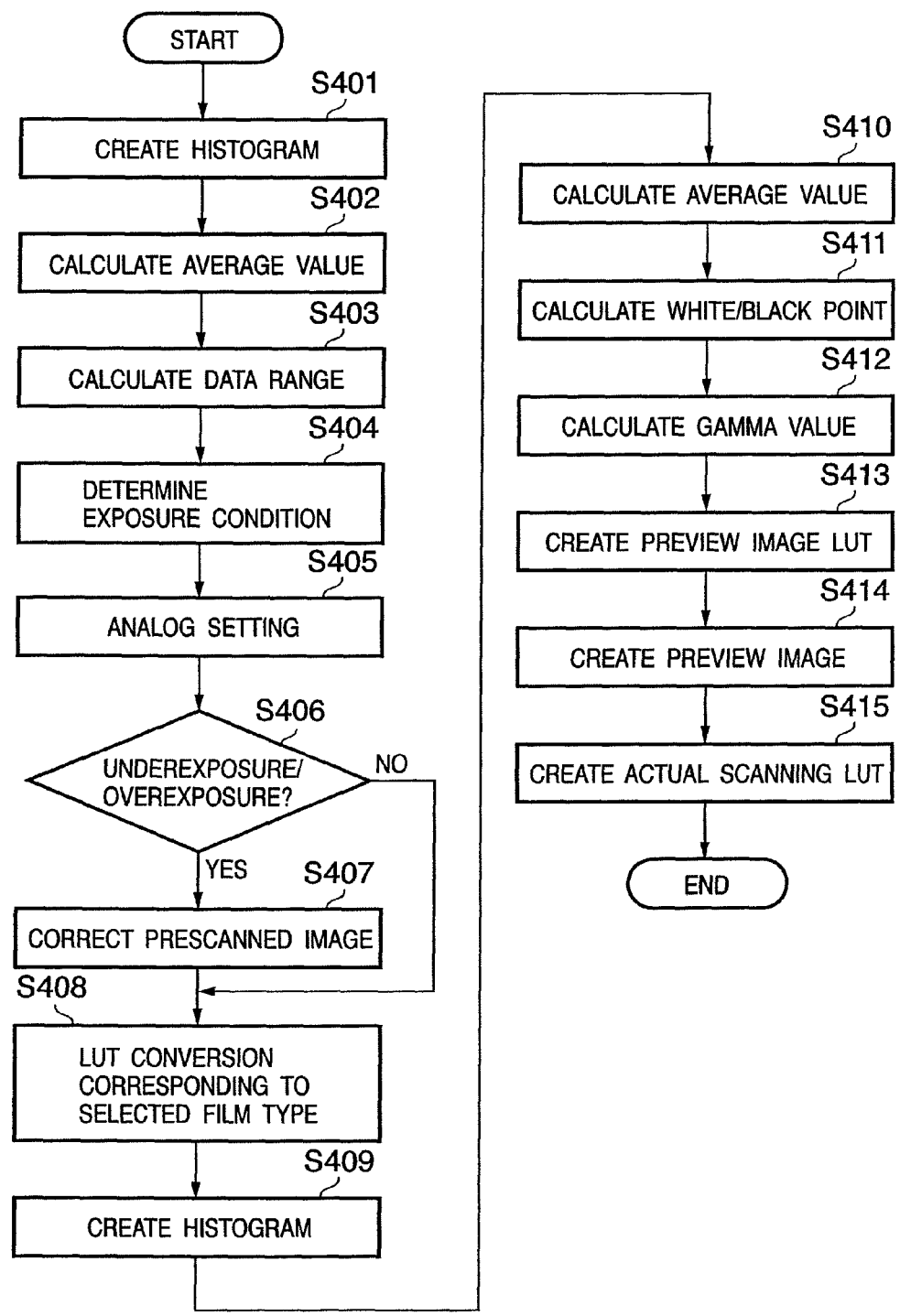
FIG. 7 is a flow chart showing a prescanning information analysis processing flow.

Processing in prescanning information analysis S209 of FIG. 5 will be described in detail. In this case, an original to be processed in the present invention is a negative film. FIG. 7 is a flow chart showing processing in prescanning information analysis (S209) by the CPU 16.

Figure 8:
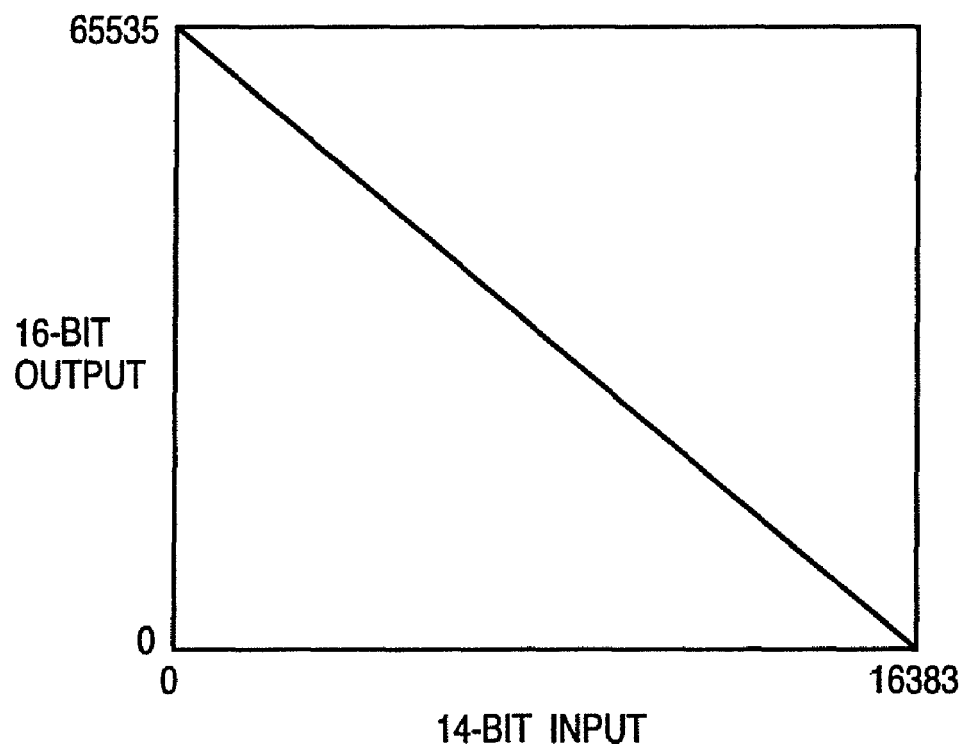
FIG. 8 is a table showing an example of a table set in a digital signal conversion table 11 in prescanning.

In step S401, the histogram of a prescanned image is created. The prescanned image is positive image data which is linear with respect to A/D-converted digital data. For example, a look-up table for a 14-bit input and 16-bit output as shown in FIG. 8 is set in the digital image converter 11 of FIG. 4. In this case, a prescanned image is an image which is converted from a negative image to a positive image by using a look-up table as shown in FIG. 8 which provides a linear output with respect to A/D-converted digital data. The histogram of each channel of a prescanned image which is linear with respect to A/D-converted digital data is created.

In step S402, the average count value of each channel is calculated from the histogram created in S401.

In step S403, the data range of each channel is calculated from the histogram created in S401. A count value at several % of pixels subjected to the histogram is calculated as a white point/black point from the highlight portion/shadow portion of the histogram. The black point count value is subtracted from the white point count value of each channel, calculating the data range of the channel.

In step S404, the exposure condition (exposure state) of an image recorded on a negative film original to be read is determined. The exposure condition is determined from the average value of each channel calculated in S402 and the data range of each channel calculated in S403. For example, an overexposed image is printed dark on a negative film at a high density, and the data range of its prescanned image is narrow. From this, when the data range of each channel is narrower than a predetermined value, the target image can be determined to be overexposed. For an underexposed image, the data range is not so different from that in correct exposure. However, an underexposed image scanned using a linear look-up table as shown in FIG. 8 results in a dark image. Thus, when the average value of each channel is smaller than a predetermined value, the image can be determined to be underexposed.

In step S405, the analog setting conditions (adjustment states) of adjustment means except the look-up table are decided (set). Items to be set are the illumination light quantity of the light source, filter, feed speed, gain, offset, and matrix. If overexposure is determined in S404, conditions are so set as to widen the data range. If underexposure is determined, conditions are so set as to prevent data saturation and "blocked-up" because A/D-converted digital data is almost saturated and "blocked-up" may occur in analog settings of prescanning. If correct exposure is determined, the same conditions as those in prescanning are set.

In step S406, the condition branches depending on exposure determined in S404. The processing advances to S407 for overexposure or underexposure, or to S408 for correct exposure.

In step S407, the prescanned image is corrected. If overexposure or underexposure is determined, scanning condition settings are different between prescanning and actual scanning. A/D-converted digital data upon changing scanning conditions must be predicted to convert a prescanned image. The prescanned image is positive image data which is linear with respect to A/D-converted digital data. The CPU 16 changes analog settings (settings for the adjustment states of respective adjustment means), and calculates how many times A/D-converted digital data is larger. The CPU 16 performs digital calculation for the prescanned image data, reflecting the result on each pixel value of the prescanned image. In this way, an actual scanning image can be simulated from the prescanned image without changing analog settings and executing scanning again.

In step S408, the prescanned image is converted using a look-up table corresponding to the selected film type. Linear-luminance positive data converted using a look-up table which provides a linear output with respect to A/D-converted digital data is converted into positive data which reflects the characteristic of each film type, absorbing the negative-base color characteristic and color balance characteristic which change depending on the film type. For this purpose, the setting value file stores in advance a look-up table for converting positive data to positive data for each film type. The CPU 16 performs table conversion processing for the prescanned image by using a look-up table corresponding to each film type. Since the prescanned image is data which is linear with respect to A/D-converted digital data, look-up table conversion processing for each film type can be easily executed. This processing can provide the same prescanned image as an image obtained by scanning using a look-up table for a selected film type with the same analog gain setting in prescanning as that in actual scanning.

In step S409, the histogram of the prescanned image having undergone table conversion processing based on the look-up table for each film type in S408 is created. The histogram of each channel is created for the converted prescanned image.

In step S410, the average value of the prescanned image converted in S408 is calculated. The average value of each channel is calculated from the histogram.

In step S411, the white/black point of the prescanned image converted in S408 is calculated. A count value at several % of pixels subjected to the histogram is calculated as a white point/black point from the highlight portion/shadow portion of the histogram.

In step S412, the gamma value of each channel is calculated. The gamma value is calculated such that the average value of each channel calculated in S410 becomes a predetermined target value after normalization using the white/black point in S411. The gamma value is calculated by $$\gamma = \log((Ave-Lo)/(Hi-Lo))/\log(Target/Max)$$

where Ave is the average value, Lo is the black point, Hi is the white point, Target is a predetermined target value, and Max is the maximum value expressible by the number of bits of a prescanned image.

In step S413, a color conversion table for a preview image (monitor display) is created. Based on the white/black point calculated in S411 and the gamma value calculated in S412, the CPU 16 creates a color conversion table (look-up table) for generating a monitor display preview image whose contrast, brightness, and color balance are adjusted, from the prescanned image which has been converted from negative data to positive data on the basis of the linear-luminance look-up table and has undergone conversion processing of reflecting the color balance and the like corresponding to each film type by using the positive/positive conversion look-up table for each film type.

In step S414, a preview image (display image) is created. The CPU 16 creates a preview image (display image) by executing table conversion using the look-up table created in S413 and matrix conversion identical to a matrix coefficient set in the color correction matrix converter 13 of FIG. 4, for the positive-converted prescanned image which reflects a color balance corresponding to each film type. The created preview image is displayed on the monitor device 18 of FIG. 4.

In step S415, an actual scanning look-up table is created. The actual scanning look-up table is created by the CPU 16 by synthesizing the linear-luminance look-up table for negative/positive conversion, a look-up table for each film type, and the preview image look-up table created in step S413.

As described above, according to the second embodiment, scanning conditions for actual scanning are set after the exposure condition of a target image is determined from the average value and data range of a prescanned image which is linear with respect to A/D-converted digital data. The exposure condition of a target image can be determined at a high precision, and scanning conditions for actual scanning optimal for each exposure condition can be set. The prescanned image is data which is linear with respect to A/D-converted digital data. When scanning conditions are different between prescanning and actual scanning, A/D-converted digital data in actual scanning can be easily predicted from a prescanned image.

After that, the prescanned image is converted using a look-up table corresponding to a selected film type. The converted prescanned image is analyzed to set an actual scanning look-up table, and a preview image is created. The negative-base color characteristic and color balance characteristic which change depending on the film type can be absorbed. An image can be reproduced on any film with a stable color balance.

Third Embodiment

The third embodiment which is different from the first embodiment in the prescanned image generation method will be described. Similar to the first embodiment, the third embodiment will be explained with reference to the flow chart of FIG. 1 and the block diagram of FIG. 3. The third embodiment will exemplify a negative film, and a series of reading processes are executed under the control of a host PC (not shown) connected to a film scanner.

<Step S1>

The user loads a negative film into the scanner. Bar codes are printed on the upper and lower surfaces of a negative film in advance in order to specify a film type. The scanner has a sensor for reading a bar code, in addition to an image reading sensor, and can obtain a bar code. The scanner stores in advance a correspondence table for bar codes and film types, and can specify a film type from a bar code.

<Step S2>

The determined film type is so displayed as to allow the user to recognize it. FIG. 2 shows a display example on a GUI according to the third embodiment. If a detected bar code is found in the correspondence table, a corresponding film type name is displayed. If the bar code is not found in the correspondence table, "standard" is displayed. In this case, a standard table is set later, and prescanning and scanning are executed. Note that the GUI also serves as a film type selecting function. If the user clicks an inverted triangle 301, the list box is opened down to display all registered film types. The user can select an arbitrary film type from the displayed film types.

<Step S3>

A color conversion table which provides a linear luminance is set in an image data converter 407. That is, the image data converter 407 holds not different color conversion tables (look-up tables) for respective film types, but a look-up table (linear-luminance color conversion table) as shown in FIG. 8 which provides a linear output with respect to the same A/D-converted digital data regardless of the film type, similar to the second embodiment.

<Step S4>

Prescanning for acquiring a confirmation prescanned image is performed. The image data converter 407 converts 14-bit negative data into 16-bit positive data by using the linear-luminance color conversion table set in step S3. The converted data is stored as prescanned image data having a linear luminance characteristic in a memory 408. Prescanned image data having a linear luminance characteristic is positive image data which is linear with respect to A/D-converted digital data. The linear-luminance positive image data is held as an original image till the end of prescanning. A color table storage 406 stores color conversion tables corresponding to respective film types. The linear-luminance image data loses its color balance because any film undergoes negative/positive conversion using the color conversion table in FIG. 8. To adjust the color balance, the image data converter 407 reads out from the color table storage 406 a color conversion table corresponding to the film type selected in step 2 for the linear-luminance prescanned image data stored in the memory 408. The image data converter 407 uses the readout color conversion table to convert linear-luminance positive data stored in the memory 408 into positive data which reflects the characteristic of each film type. The converted positive data is stored in the memory 408. With a color conversion table corresponding to the film type, the difference in color balance due to the difference in film type can be absorbed.

<Step S5>

If the scanner fails to determine the film type or the user reselects an arbitrary film type, the user reselects a film type by using the GUI in FIG. 2. Even with the same bar code, the color balance may change due to variations in photographing conditions, film developing, and the like. To cope with this situation in the third embodiment, the user can register a plurality of types of tables with different color balances, details of which will not be described. For example, for a film type "Codak Gold 100", a plurality of tables such as "Codak Gold 100-1", "Codak Gold 100-2", and "Codak Gold 100-3" are registered with different color balances for the same bar code in the color table storage 406. The user can arbitrarily select a table by using the GUI in FIG. 2.

<Step S6>

Whether the user has reselected a film type, i.e., table is determined.

<Step S7>

If the user does not reselect any film type, the linear-luminance table and a color conversion table corresponding to the film type which has already been selected automatically are synthesized, and the synthesized table is set in the image data converter 407. Scanning for obtaining a high-resolution image to be actually used is performed, obtaining an image. The same scanning as prescanning is done except the differences in resolution and color table. The scanning result is transferred to the memory 408 and displayed on the monitor, or recorded on a hard disk.

<Step S8>

If the user reselects a film type, color conversion corresponding to the reselected film type is performed for all prescanned images. That is, a color table corresponding to the reselected film type is applied to linear-luminance original image data. The result of color conversion is immediately displayed on the monitor (not shown), and the user can confirm the difference between the tables as an image in real time. This will be further explained with reference to the block diagram of FIG. 3. The color conversion table newly reselected by the user is transferred from the color conversion table storage 406 to a confirmation image changing unit 409. The prescanned original image stored in the memory 408 is transferred to the confirmation image changing unit 409, the table reselected by the user is applied, and processing is executed. The processing result is transferred to the memory 408, and displayed on the monitor.

<Step S9>

The linear-luminance table and the color conversion table reselected by the user are synthesized, and the synthesized table is set in the image data converter 407. Scanning for obtaining a high-resolution image to be actually used is performed, obtaining an image. The same scanning as prescanning is done except the differences in resolution and color conversion table. The scanning result is transferred to the memory 408 and displayed on the monitor, or recorded on a hard disk.

Note that the third embodiment adopts a linear-luminance table in order to obtain an original image in prescanning. However, the present invention is not limited to this as long as the same table is used regardless of the film type. For example, a table with a linear density characteristic or a nonlinear table with an arbitrary shape can be employed.

As described above, according to the third embodiment, the user can reselect a film type even after prescanning.

Moreover, a high-quality image can be reproduced by accurately determining the exposure condition of an original film and performing optimal analog settings. The color balance characteristic which changes depending on the film type can be eliminated, and an actual scanning image by a preview image can be easily simulated at a high precision.

The present invention is not limited to the above embodiments and various changes and modifications can be made within the spirit and scope of the present invention. Therefore, to apprise the public of the scope of the present invention the following claims are made.

What is claimed is:

1. An image reading system which can read a film original and performs at least two scanning operations including pre-scanning and actual scanning, comprising:
- a film type selecting unit;
- an image data converter adapted to convert pre-scanned image data; and
- an image display unit;
- wherein a film type can be selected by said film type selecting unit after obtaining at least pre-scanned image data,
- wherein if the film type is changed by said film type selecting unit after obtaining pre-scanned image data, the pre-scanned image data is converted by said image data converter in accordance with the changed film type, and the converted result of the pre-scanned image data can be confirmed by displaying the resulting image by said image display unit before the actual scanning is performed, and
- wherein said image changing unit comprises a calculation unit adapted to calculate a difference between a color conversion table used to acquire pre-scanned image data and a color conversion table corresponding to a film type newly selected by said film type selecting unit after acquiring pre-scanned image data, and means for adding the calculated difference to the pre-scanned image data.

2. The system according to claim 1, wherein said image changing unit holds original image data obtained in acquiring prescanned image data, and applies to the original image data a color conversion table corresponding to a film type newly selected by said film type selecting unit after acquiring the pres-canned image data.

3. A computer program product comprising a computer readable medium having computer readable program code embodied in said medium for reading a film original and performing at least two scanning operations including pre-scanning and actual scanning, comprising:
- a pre-scanning module for obtaining pre-scanned image data;
- an actual scanning module for obtaining actually scanned image data;
- a film type selecting module;
- an image changing data conversion module for changing converting pre-scanned image data; and
- an image display module,
- wherein a film type can be selected in the film type selecting module after obtaining at least the pre-scanned image data,
- wherein if the film type is changed by the film type selecting module after obtaining pre-scanned image data, the pre-scanned image data is converted by the image data conversion module in accordance with the changed film type, and the converted result of the pre-scanned image data can be confirmed by displaying the resulting image by the image display module before the actual scanning is performed, and
- wherein the image changing module comprises a module for calculating a difference between a color conversion table used to acquire pre-scanned image data and a color conversion table corresponding to a film type newly selected by the film type selecting module after acquiring pre-scanned image data, and a module for adding the calculated difference to the pre-scanned image data.

4. The computer program product according to claim 3, wherein the image changing module holds original image data obtained in acquiring pres-canned image data, and applies to the original image data a color conversion table corresponding to a film type newly selected by the film type selecting module after acquiring the pres-canned image data.

* * * * *